United States Patent [19]
Lee

[11] Patent Number: 5,551,280
[45] Date of Patent: Sep. 3, 1996

[54] MULTI PURPOSE SHOCK SENSOR

[75] Inventor: Sang-Moon Lee, 107 Na-dong Kangnam 1st A.P.T. 923-30, Hogye 2-dong, Dongahn-gu, Ahnyang-si, Kyungki-do, Rep. of Korea

[73] Assignees: Sang-Moon Lee; Ja-Young Yoon, both of Kyungki-do, Rep. of Korea

[21] Appl. No.: 511,694

[22] Filed: Aug. 4, 1995

[30]     Foreign Application Priority Data

Aug. 6, 1994 [KR]   Rep. of Korea ................... 94-19393

[51] Int. Cl.$^6$ ..................................................... G01M 7/00
[52] U.S. Cl. ........................ 73/12.08; 73/12.09; 340/566
[58] Field of Search ............................... 73/11.09, 12.08, 73/12.09, 12.12; 200/61.45 R, 61.52, 61.52 A; 340/429, 566, 665, 666

[56]              References Cited

U.S. PATENT DOCUMENTS 3,473,366  10/1969  Smith ................................. 73/12.08 X
4,247,847   1/1981  Gontowski, Jr. ......................... 340/566
4,450,326   5/1984  Ledger ................................. 340/429 X
4,679,033   7/1987  Hwang ................................... 340/566
5,053,589  10/1991  Grant ............................... 200/61.45 R
5,339,071   8/1994  Eckhaus ................................. 340/665

*Primary Examiner*—Richard Chilcot
*Assistant Examiner*—Elizabeth L. Dougherty
*Attorney, Agent, or Firm*—Maria Parrish Tungol; John A. Parrish

[57]                ABSTRACT

This invention relates to multi purpose shock sensor being used as a vehicle burglar alarm and/or a security system for restricted area, which consists of a cap, a vibration sensing element, a sealed cavity, and a balance weight in the characterized that having a safety cover securely fixed and surrounded with the elastic cap, preparing a gap having a fixing surface and a free surface on inner peripherals of the safety cover, fixing a lid on the safety cover, forming a groove on a peripherals of a balance weight, forming a coupling hole on the center of the cap, and coupling the balance weight into the coupling hole in the top of the cap.

7 Claims, 5 Drawing Sheets

5,551,280

MULTI PURPOSE SHOCK SENSOR

FIELD OF INVENTION

This invention relates to a multi-purpose shock sensor which can be used as a vehicle burglar alarm system for restricted areas.

BACKGROUND OF INVENTION

As is well known in the industrial field, in order to detect a shock on a vehicle burglar alarm or system, a Piezo sensor or a sensing unit consisting of a coil with a magnet functioning by shock, or a sensing unit consisting of a switch which would be switched on/off by vibration has been used.

In a Piezo sensor perceiving a shock there is the disadvantage that the life time of the sensor is limited due to use of a metal vibration sheet which is highly corrosive. Also, the sensitivity is not satisfactory.

On the other hand, a sensor consisting of a coil and a magnet suffers the disadvantage that a flexible suspending means such as a rubber bar must be activated by an external shock. This type of sensor is also complicated to assemble and disassemble, and also has a large volume.

Additionally, in a sensor consisting of a switch which can be switched on/off by a shock, there is the disadvantage that, due to the need for the switch contact to be activated by a shock, that sensitivity is not satisfactory.

Applicant has previously provided an enhanced sensitivity shock sensor. The sensor includes a cap that is enclosed on its upper part and is open on its bottom. A vibration sensing element such as a condenser microphone is inserted and fixed in the bottom of the cap. A sealed cavity is provided between the cap and the vibration sensing element. A rounded edge for attaching a metallic balance weight protrudes from one end of the cap. This embodiment shows the advantage of enhanced anti-corrosivity due to the sealed construction. Also, due to its simple construction, manufacturing cost is lower. Also, because vibration inside the sealed cavity is induced in proportion to the magnitude of the shock by the balance weight, as well as due to the small and light construction of the system, the design can be simplified.

Output from the above-described enhanced sensitivity shock sensor is amplified by an amplifier and supplied to an alarm system, and thereafter functions as a sensor. However, this device has a disadvantage in that peripherals such as a rubber cap is apt to be damaged by tools during assembling and setting up, and by rough handling. Also, the cap could be weakened by long term exposure to undesirable atmospheres such as toxic and corrosive gas and/or temperature and humidity.

Also, the above prior art shock sensor could be activated by air flows which come from either vehicle crossings over different directions or from inside the vehicle when parked in a sunny place or from opening of the doors. These are disadvantages since the sensor should be activated only by shocks.

The prior art has also employed bonding to join a balance weight to a cap. Use of bonding to join the balance weight to the cap may cause problems such as undesirable movement of the balance weight under conditions of high temperature and high humidity so that the reliability could not be guaranteed.

SUMMARY OF THE INVENTION

The invention addresses the prior arts disadvantages and prolongs the life time through which an elastic rubber cap can be properly activated by upward, downward, left handed and right handed directional vibrations. Also, the cap is not damaged by tools etc. during assembly and setting-up. Also, the cap is not affected by the environmental conditions such as toxic gases, high temperature and high humidity.

The invention provides a unique shock sensor which is activated only by shock through which an elastic cap is activated only by the vibration from the shock rather than by air flows or very low frequency vibrations.

The invention enhances reliability of the sensor since the balance weight does not move around and is securely joined to the cap.

BRIEF DESCRIPTION OF THE INVENTION

The invention can be achieved by securely joining an elastic cap with a surrounding safety cover that has a diameter that is a little less than the diameter of the cap. A gap for providing a free surface and a fixing surface inside the safety cover is thus provided. A lid covers the upper part of the safety cover so that the elastic cap which encloses a vibration sensing element can be activated by outside vibration through the safety cover. The elastic cap thus is vibrated up and down as well as right and left with coupling (not bonding) of the balance weight to the cap, as will be described in detail according to a preferred embodiment as shown in the attached drawings.

DETAILED DESCRIPTION OF THE PREFERRED EMBODIMENT

Figure 1:
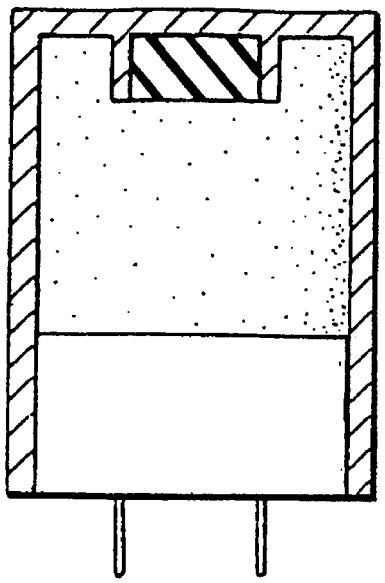
FIG. 1 shows a cross section of a shock sensor according to the prior art.
Figure 2:
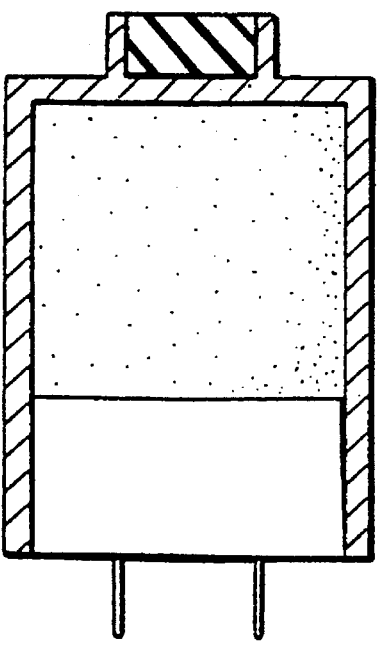
FIG. 2 shows a cross section of another shock sensor according to the prior art.
Figure 3:
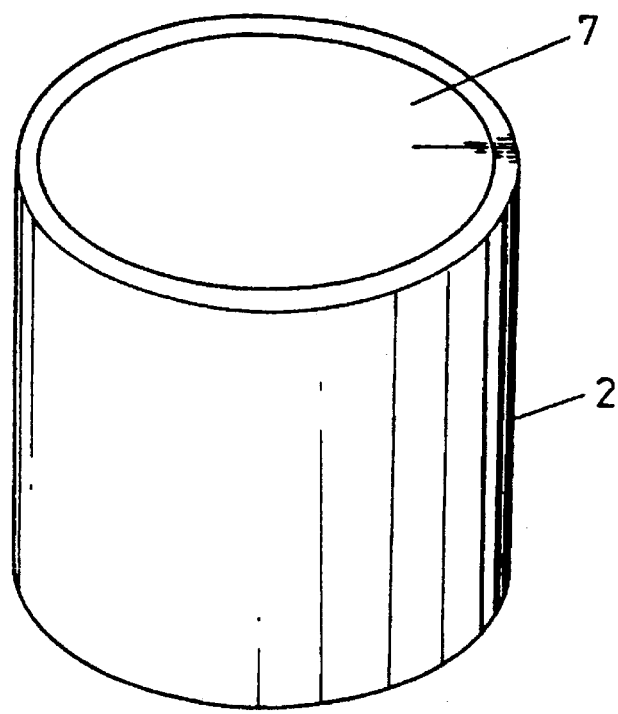
FIG. 3 shows a elevational view of the multipurpose shock sensor according to the invention.
Figure 5:
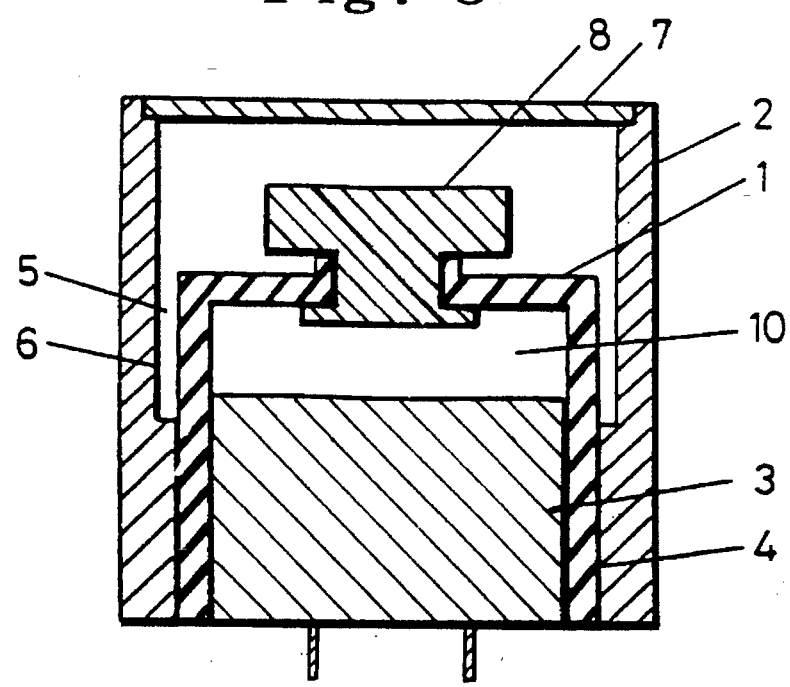
FIG. 5 shows a cross-sectional assembly view of the multipurpose sensor of FIG. 4.
Figure 4:
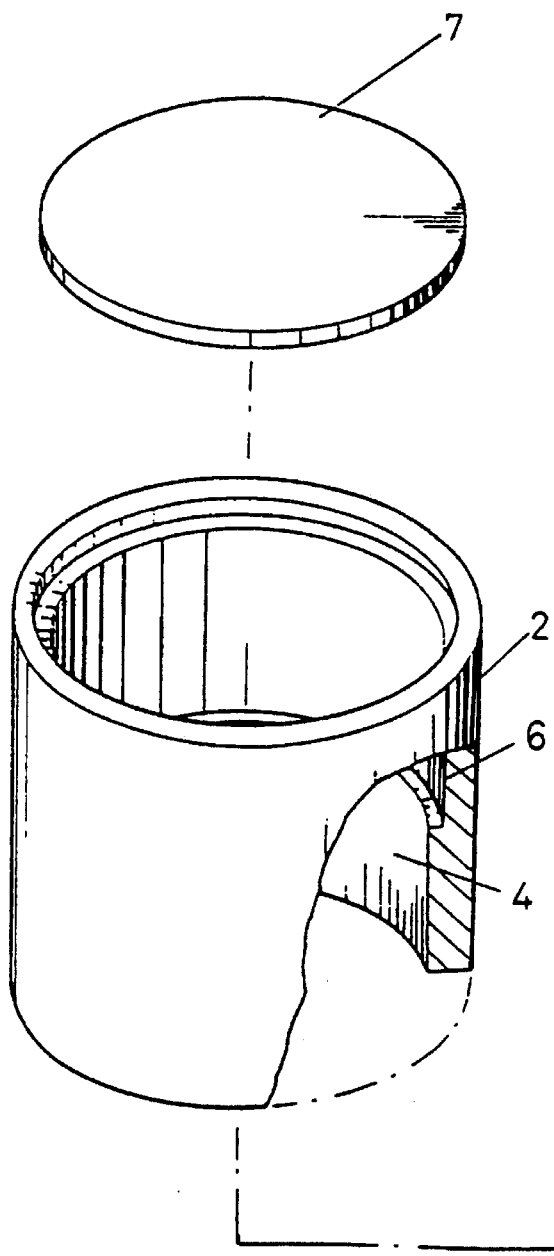
FIG. 4 shows a an exploded view, partially in cross section of the multipurpose sensor according to the invention.
Figure 4:
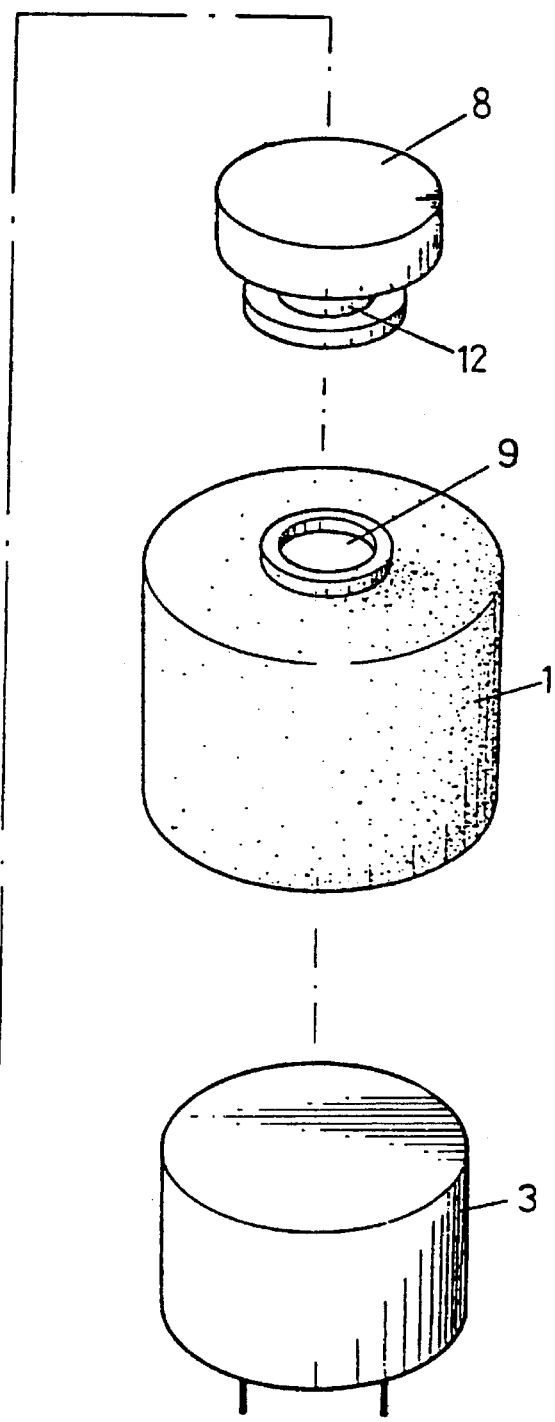

As shown in FIG. 4 and FIG. 5, a first embodiment of the invention consists of a cap(1) which has a closed upper part and an open lower part. A vibration sensing element(3) is inserted and joined to the lower part of the interior of cap (1). Balance weight(8) couples onto the upper end of cap(1). Safety cover(2) securely joins to and surrounds elastic cap(1) to provide gap(5). Cover (2) has a fixing surface (4) which contacts element (3). Lid(7) is placed on safety cover(2) and a groove(12) is formed on the surface of balance weight(8). Coupling hole(9) is provided on the center of the top of cap(1). The diameter of coupling hole (9) is slightly less than the diameter of groove(12). After assembly, a sealed cavity(10) is provided inside cap(1) by positioning balance weight (8) in coupling hole(9) in the center of the top of the cap(1).

The invention first transfers vibration from an external shock to safety cover(2). This transfer can vibrate the entire safety cover(2). As a result of vibration of safety cover(2), the air inside cover (2) is vibrated, and the inside air thus vibrates elastic cap(1).

Even though cap(1) is joined to fixing surface(4), cap (2) can be vibrated in the space provided by gap(5). Thus, due to vibration of cap(1), air inside sealed cavity(10) vibrates and vibration sensing element(3) can sense the shocks. Element(3) then can generate electrical signals. The invention thus provides a high sensitivity shock sensor that can sense a weak external shock.

The output of vibration sensing element(3) is amplified by an amplifier and then supplied to an alarm system so that human life and assets can be protected.

According to the invention, rubber cap(1) is covered by safety cover(2) which is made of light weight synthetic resin such as ABS so that damage from contact by tools during assembly and setting-up can be avoided. Even when exposed to toxic gas, high temperature and high humidity, rubber cap(1) is protected by safety cover(2) so that deterioration can be prevented to provide a longer life-time.

Balance weight(8) is inserted into coupling hole(9) on the top of cap(1). By force on cap(1), groove(12) of balance weight(8) is tightened so that sealed cavity(10) is formed. Simultaneously, balance weight(8) is more securely joined to cap (1) than by bonding so that balance weight(8) is prevented from moving. Therefore the reliability of the sensor can be increased.

The invention provides a sensor that is not activated by air flow or vibration so that it is possible to use a unique shock sensor.

In the prior art, elastic cap(1) would be vibrated by air flow, and accordingly the shock sensor would be activated as if a shock had occurred. Accordingly, a sensor that is not activated by air flow is needed.

In this invention, light-weight safety cover(2) is not vibrated by the air flow, and accordingly, rubber cap(1) also is not been vibrated. Thus, output from the sensor would not occur.

Accordingly, activation due to air flow can be prevented, and it is possible to supply a suitable shock pursuant to the applications, and to reduce malfunctions.

Figure 6:
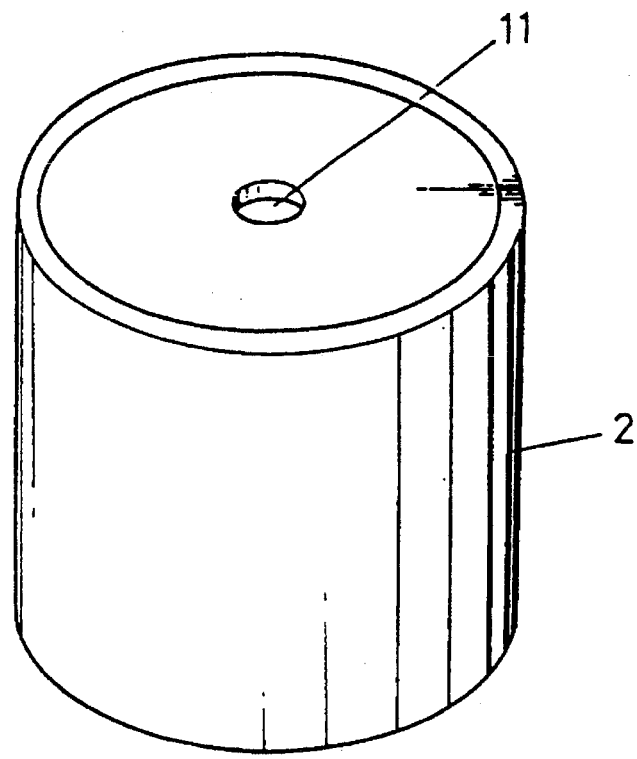
FIG. 6 shows an elevational view of another embodiment of the sensor according to the invention.
Figure 8:
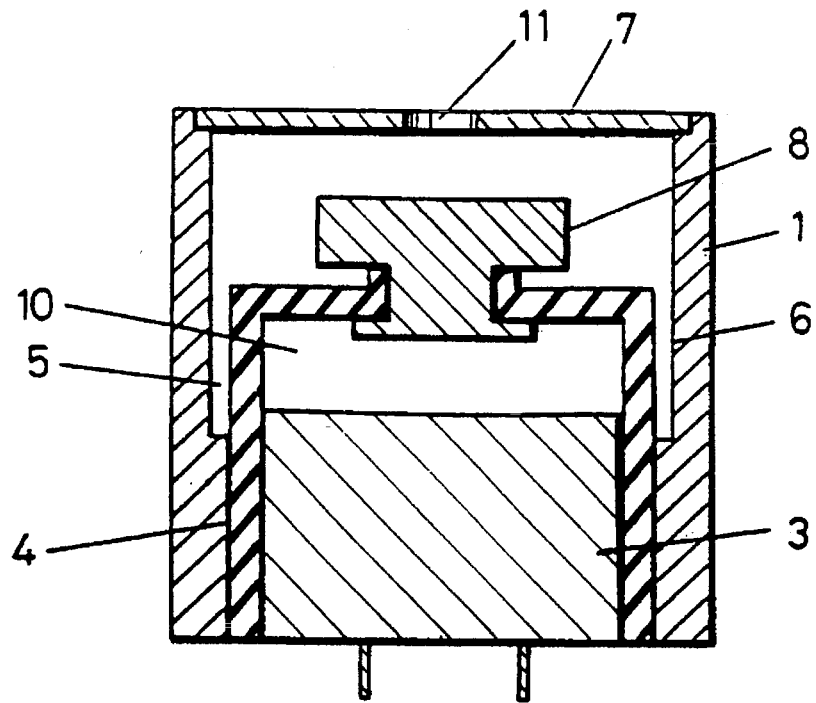
FIG. 8 shows a cross-sectional view of the sensor shown in FIG. 6.
Figure 7:
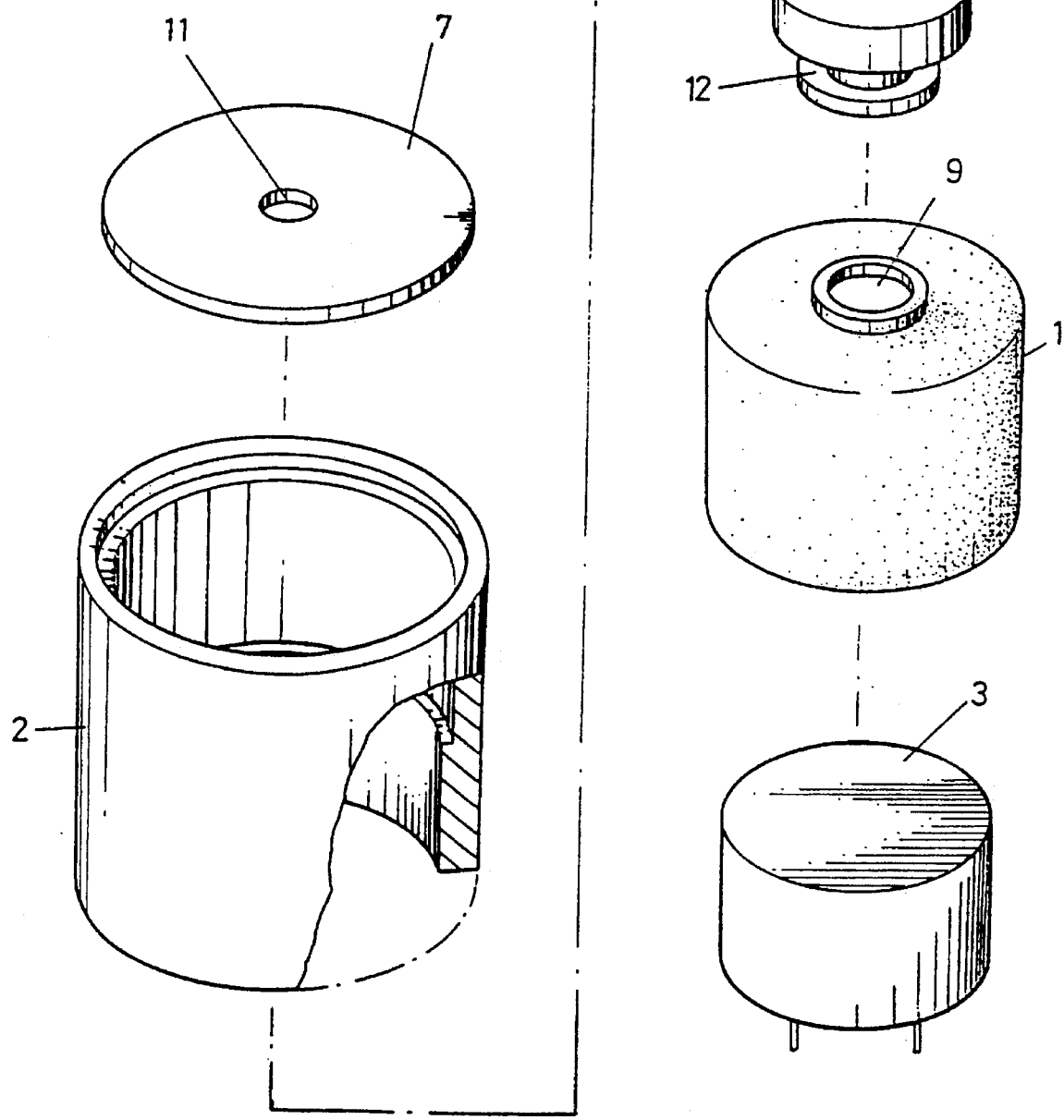
FIG. 7 shows an exploded view of the sensor shown in FIG. 6.

As shown in FIG. 6 and FIG. 8, the center of lid(7) includes opening (11). Cap(1) is vibrated by air extrusion due to air flow from inside safety cover(2). The sensor thus can be used as a very low frequency and shock perceiving sensor which can sense a door opening etc. From this, a variety of applications could be developed.

According to the invention, cap(1) is prevented from being damaged during handling and from deterioration by toxic gas, high temperature and high humidity so that reliability can be enhanced.

Also, balance weight(8) is safely fixed and prevented from being moved so that products can be more reliable.

Further, there could be more applications for selective manufacturing to perceive door openings while also sensing very low frequencies according to requirements.

What is claimed is:

1. A multipurpose shock sensor consisting of:

a cap(1) having an upper part and an open lower part, said upper part having a coupling hole(9) therein, a vibration sensing element(3) located within said lower part of said cap(1);

a balance weight(8) having a groove (12) having a diameter, said balance weight (8) joined to said upper end of said cap(1) in said coupling hole (9) to provide a sealed cavity(10) formed by said cap(1) and said vibration sensing element(3), said coupling hole(9) having a diameter less than said diameter of said groove(12);

a safety cover(2) having a surface (4) which securely joins and surrounds said cap(1), and a lid (7) joined to said safety cover (2), said safety cover (2) having an inner surface(6) spaced from said cap (1) to provide a gap(5) between said safety cover (2) and said cap(1).

2. The sensor of claim 1 wherein said lid (7) has an opening in the center of said lid.

3. A multipurpose shock sensor comprising, a cap(1) having an upper part and an open lower part, said upper part having a coupling hole(9) therein, a vibration sensing element located within said lower part of said cap(1);

a balance weight(8) joined to said upper end of said cap(1) to provide a sealed cavity(10) formed by said cap(1) and said vibration sensing element(3), and a safety cover(2) which securely joins and surrounds said cap(1).

4. The sensor of claim 3 wherein said balance weight(8) includes having a groove (12) having a diameter, said balance weight (8) joined to said upper end of said cap(1) in a coupling hole (9) in said safety cover (2).

5. The sensor of claim 4 wherein said safety cover(2) comprises a surface (4) which securely joins and surrounds said cap(1).

6. The sensor of claim 5 wherein said safety cover (2) further comprises an inner surface(6) spaced from said cap (1) to provide a gap(5) between said safety cover (2) and said cap(1).

7. The sensor of claim 6 wherein said lid (7) has an opening in the center of said lid.

* * * * *